United States Patent [19]

Tanaka et al.

[11] Patent Number: 5,325,513
[45] Date of Patent: Jun. 28, 1994

[54] APPARATUS FOR SELECTIVELY ACCESSING DIFFERENT MEMORY TYPES BY STORING MEMORY CORRELATION INFORMATION IN PREPROCESSING MODE AND USING THE INFORMATION IN PROCESSING MODE

[75] Inventors: Koichi Tanaka, Kawasaki; Kiichiro Tamaru, Tokyo; Akira Kanuma; Yasuo Yamada, both of Yokohama, all of Japan

[73] Assignee: Kabushiki Kaisha Toshiba, Kawasaki, Japan

[21] Appl. No.: 870,758

[22] Filed: Apr. 20, 1992

Related U.S. Application Data

[63] Continuation of Ser. No. 789,536, Nov. 8, 1991, abandoned, which is a continuation of Ser. No. 618,600, Nov. 29, 1990, abandoned, which is a continuation of Ser. No. 159,337, Feb. 23, 1988, abandoned.

[30] Foreign Application Priority Data

Feb. 23, 1987 [JP] Japan .................................. 62-39581

[51] Int. Cl.⁵ .............................................. G06F 1/04
[52] U.S. Cl. ..................................... 395/500; 395/425; 364/949.4; 364/950.5; 364/270.4; 364/261.2; 364/DIG. 2
[58] Field of Search ................... 364/DIG. 1, DIG. 2; 395/425, 500, 550

[56] References Cited

U.S. PATENT DOCUMENTS

| | | |
|---|---|---|
| 3,354,430 | 11/1967 | Zeitler, Jr. et al. ................. 364/200 |
| 3,376,554 | 4/1968 | Kotok et al. ........................ 364/200 |
| 3,714,635 | 1/1973 | Hamilton et al. ................... 395/775 |
| 3,753,232 | 8/1973 | Sporer ................................ 364/200 |
| 3,810,110 | 5/1974 | Kotok et al. ........................ 364/200 |
| 3,974,479 | 8/1976 | Kotok et al. ........................ 364/200 |
| 3,984,812 | 10/1976 | Dahlberg et al. ................... 364/200 |
| 4,057,846 | 11/1977 | Cockerill et al. ................... 364/200 |
| 4,095,265 | 6/1978 | Vrba ................................... 364/200 |
| 4,499,536 | 2/1985 | Gemma et al. ................. 395/500 X |
| 4,500,933 | 2/1985 | Chan ............................ 395/250 X |
| 4,520,458 | 5/1985 | Hattori et al. ...................... 364/900 |
| 4,814,981 | 3/1989 | Rubinfeld ........................... 364/200 |
| 4,899,306 | 2/1990 | Green ................................. 395/500 |

FOREIGN PATENT DOCUMENTS

| | | |
|---|---|---|
| 53-135526 | 11/1978 | Japan . |
| 57-12468 | 1/1982 | Japan . |
| 61-29961 | 2/1986 | Japan . |
| 62-276643 | 12/1987 | Japan . |

OTHER PUBLICATIONS

Blake et al., "A VLSI Chip Set For An Integrated Text and Graphics Video Subsyetem," IEEE International Solid-State Circuits Conference, Digest of Technical Papers, pp. 126–127, Feb. 20, 1986.
Curtis, Walter, "Silicon Compliation: the Future is Now," *IEEE Potentials*, pp. 27–29 (May, 1986).
Copy of Japanese Office Action dated Jan. 19, 1993.
English language translation of Japanese Office Action dated Jan. 19, 1993.
Patent Abstracts of Japan, Unexamined Japanese Publication 57-12468, Watari (Jan. 22, 1982).
Patent Abstracts of Japan, Unexamined Japanese Publication 61-29961, Soma (Feb. 12, 1986).
Patent Abstracts of Japan, Unexamined Japanese Publication 62-276643, Horii et al. (Dec. 1, 1987).

*Primary Examiner*—Thomas C. Lee
*Attorney, Agent, or Firm*—Finnegan, Henderson Farabow, Garrett & Dunner

[57] ABSTRACT

In a data processing apparatus, when making an access to a specific object to be accessed, the data processor supplies an access control signal to a plurality of control signal generators. The data processor further supplies accessed object type data to the accessed object type determining circuit. The determining circuit determines the type of the accessed object on the basis of the accessed object type data, and selectively drives the control signal generator corresponding to the accessed object. The control signal generator driven converts the access control signal into a control signal adapted for the accessed object. An address signal and data are transferred between the specific accessed object supplied with this control signal and the data processor via the address bus and data bus.

2 Claims, 8 Drawing Sheets

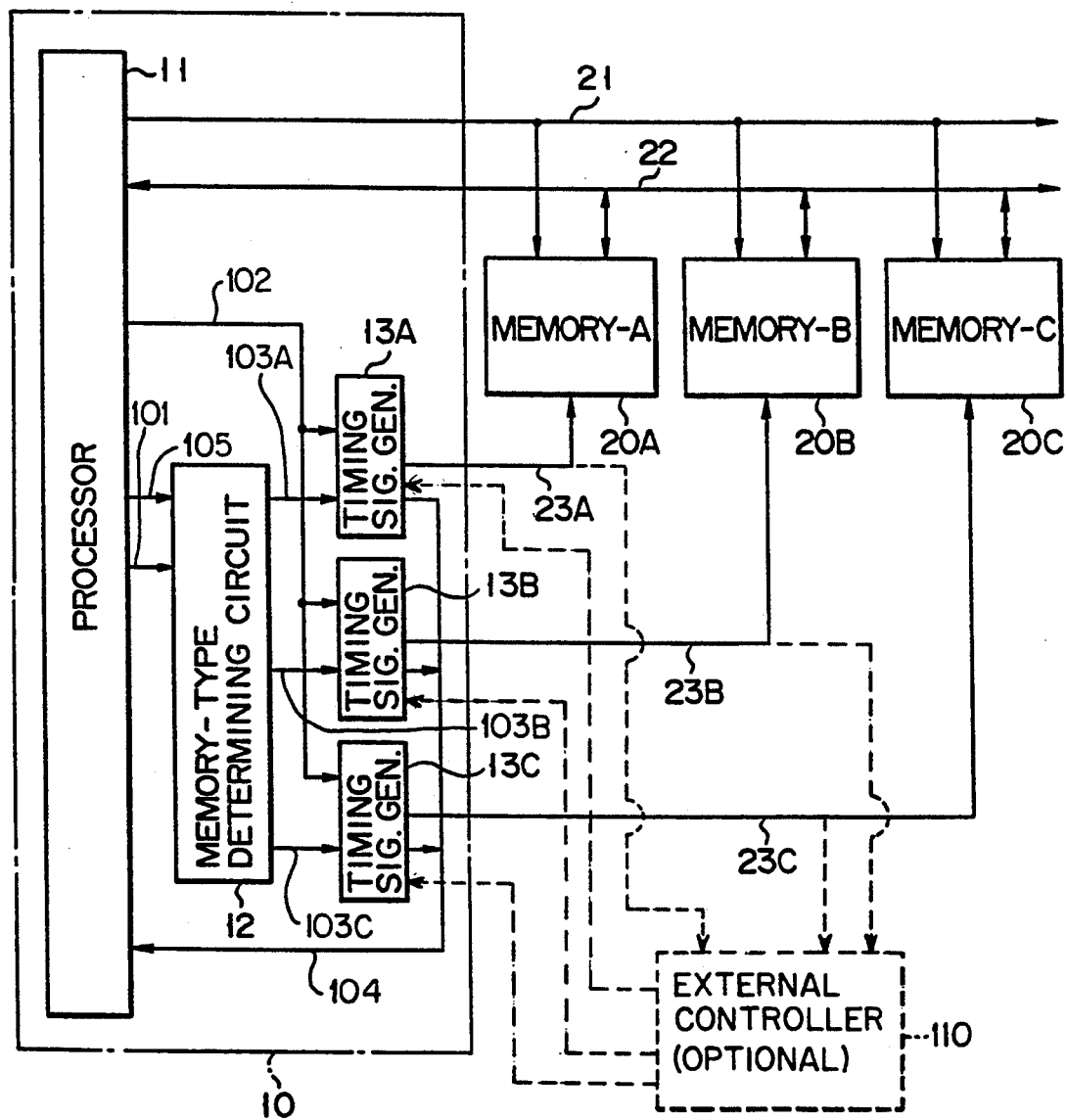
F I G. 1

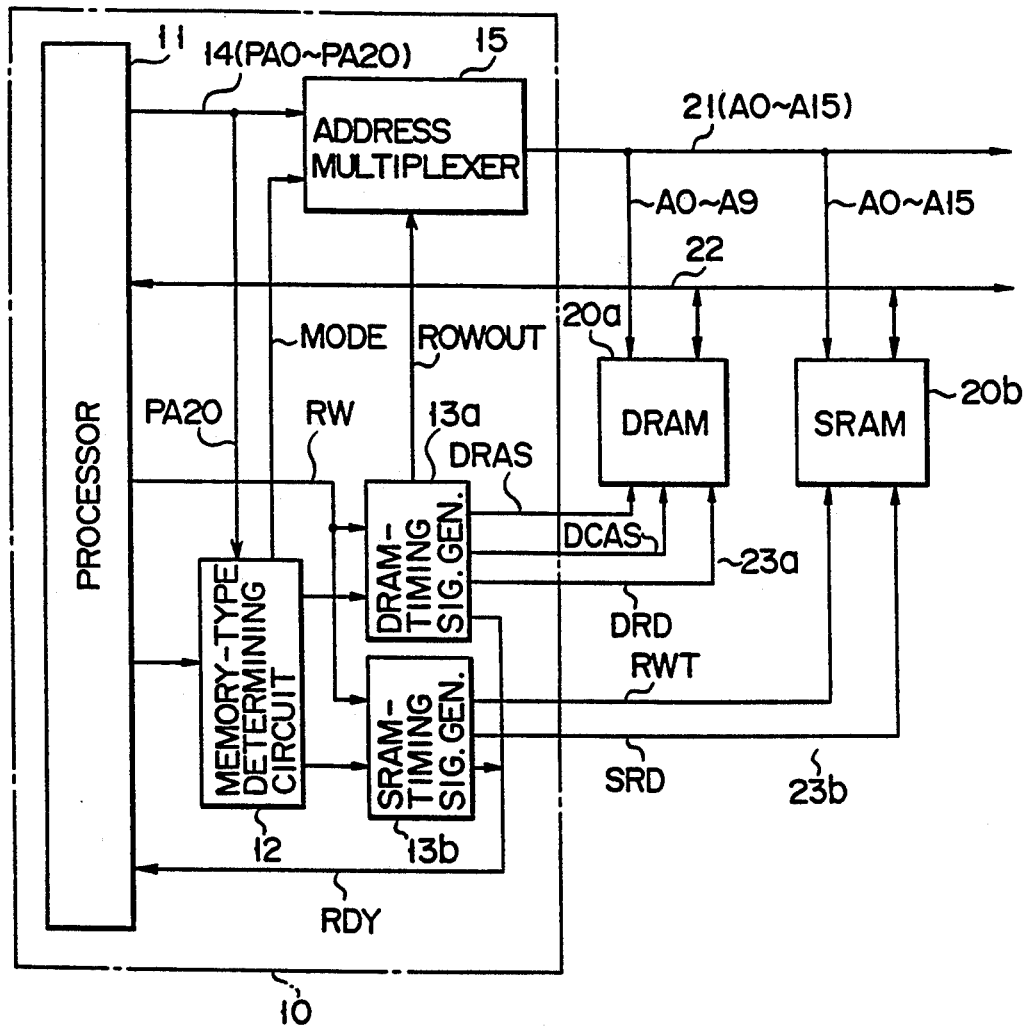
F I G. 2

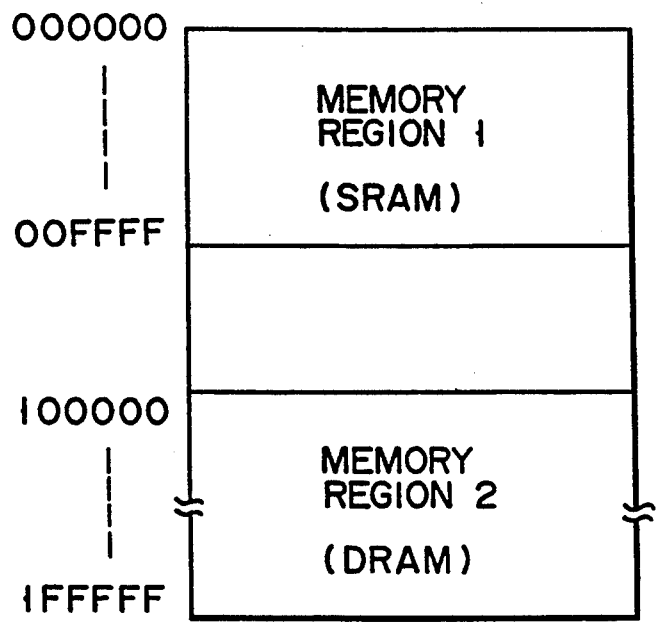
F I G. 3
|  | MODE = L | MODE = H | |
|---|---|---|---|
| EXTERNAL ADDRESS BUS | MEMORY REGION 1 | MEMORY REGION 2 | |
|  |  | ROWOUT = H | ROWOUT = L |
| A0 ¦ A9 | PA0 ¦ PA9 | PA10 ¦ PA19 | PA0 ¦ PA9 |
| A10 ¦ A15 | PA10 ¦ PA15 | INVALID | INVALID |
F I G. 4

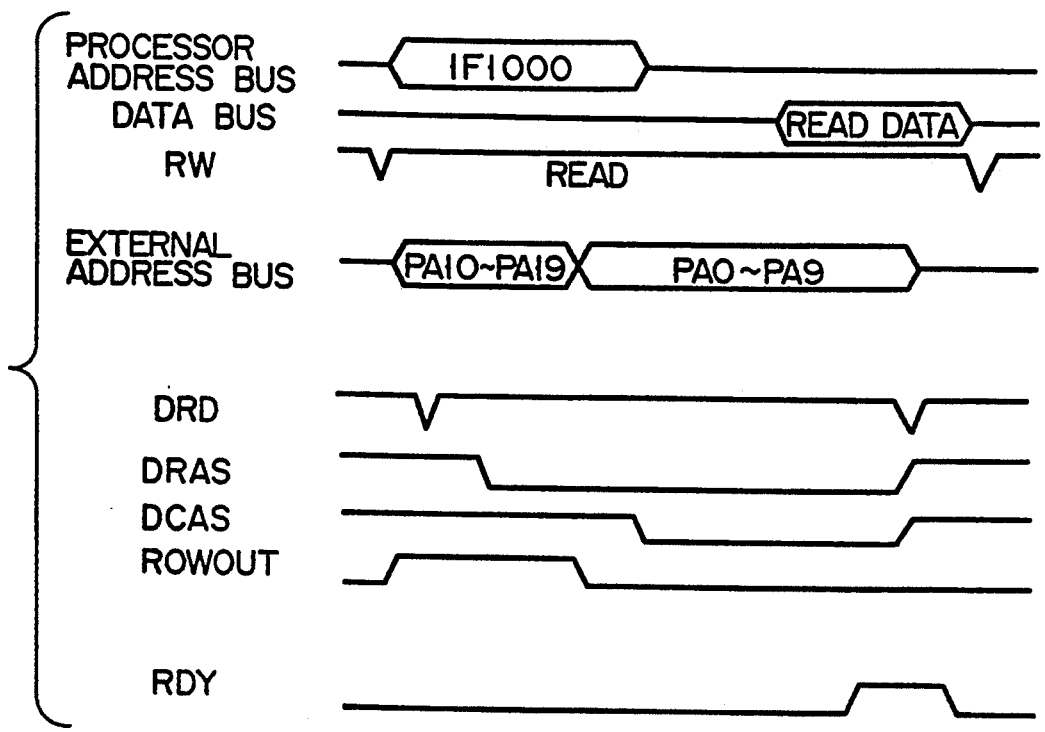
F I G. 7
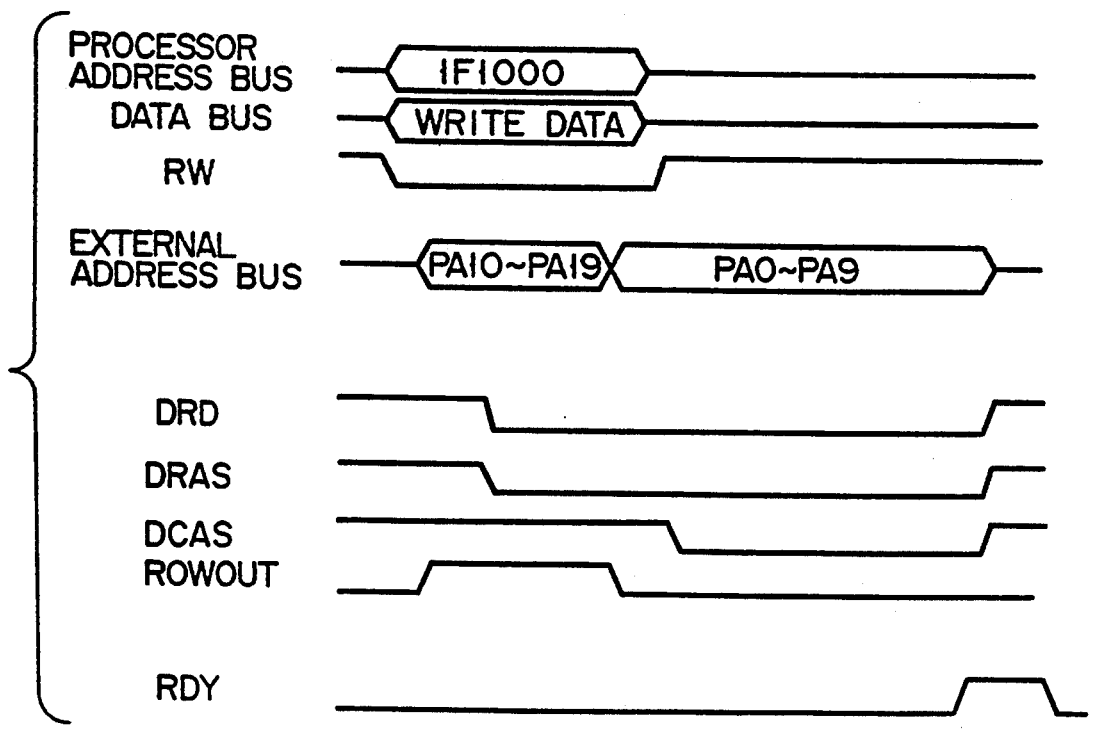
F I G. 8

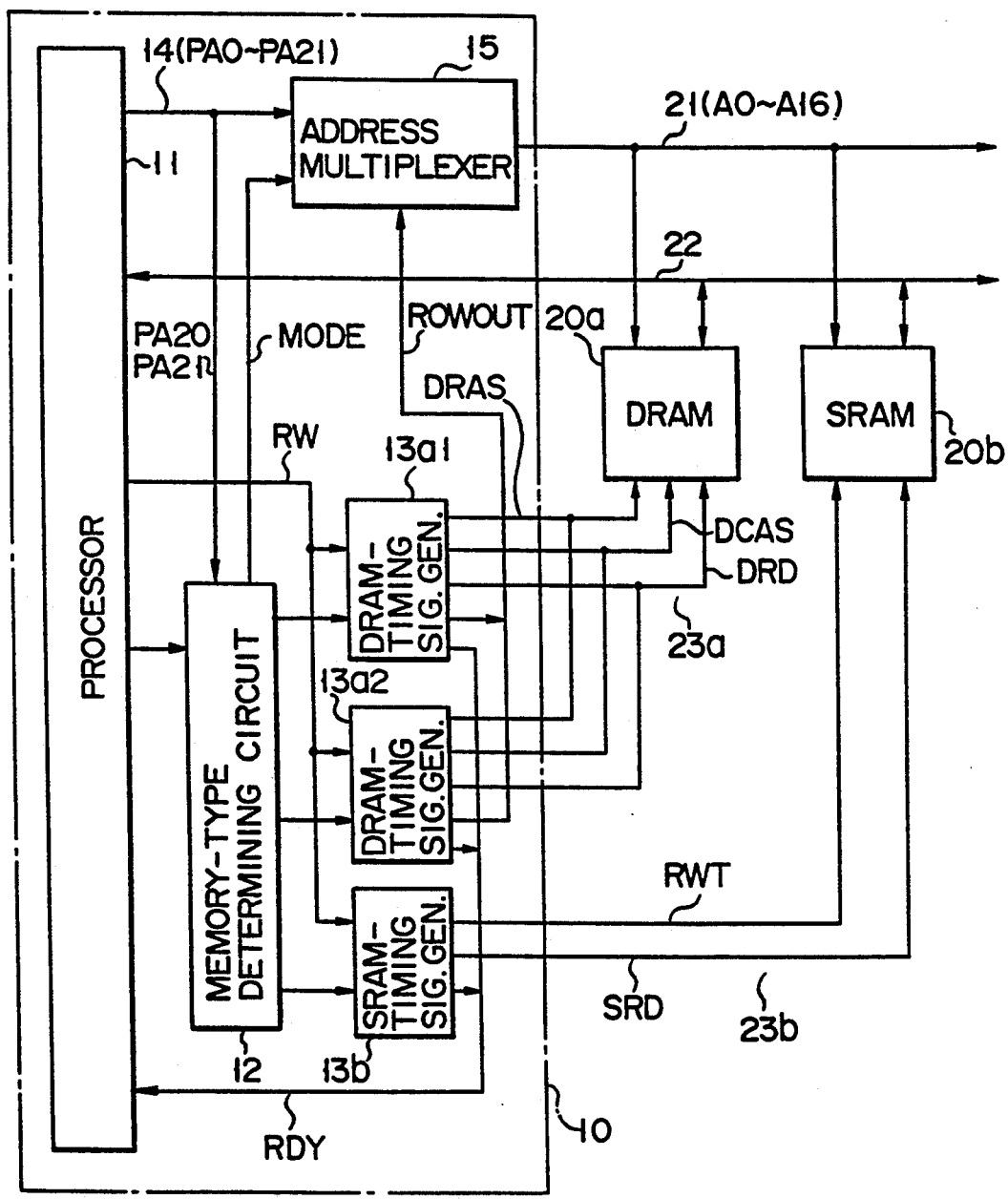
F I G. 10

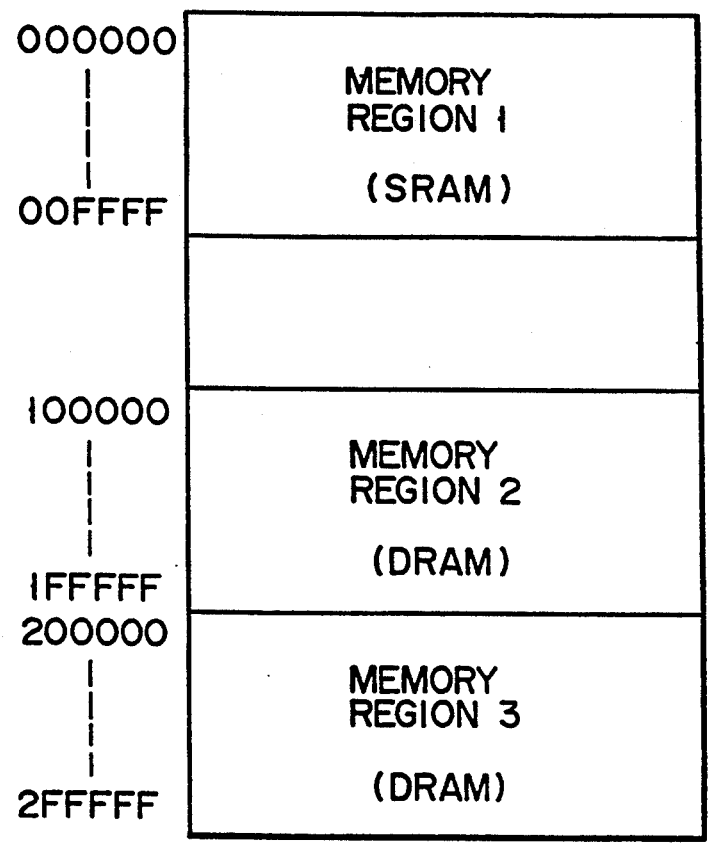
F I G. 11

APPARATUS FOR SELECTIVELY ACCESSING DIFFERENT MEMORY TYPES BY STORING MEMORY CORRELATION INFORMATION IN PREPROCESSING MODE AND USING THE INFORMATION IN PROCESSING MODE

This application is a continuation of application Ser. No. 07/789,536, filed Nov. 8, 1991, now abandoned, which is in turn a continuation of Ser. No. 07/618,600, filed Nov. 29, 1990, now abandoned, which is in turn a continuation of Ser. No. 07/159,337, filed Feb. 23, 1988 now abandoned.

BACKGROUND OF THE INVENTION

1. Field of the Invention

This invention relates to a data processing apparatus for controlling the data bus, address bus, and control signal buses for connecting a data processor with memory devices as objects to be accessible by the data processor, peripheral devices, or other data processors.

2. Description of the related art

In connecting a data processor to an external memory, peripheral devices, or other data processors of the type different from the former-recited data processor, a general-purpose type control system is used, which is independent of the objects to be accessed. When the accessed objects are memories, signals adaptable for these memories and a control system are used. Particularly, the latter system minimizes the additional circuits required for connection.

In the network control system, there are frequent cases that the programs stored in a ROM coexist with a large amount of data to be read out of and written into a memory, or that only the initializing program is stored in the ROM, and the program to be executed is read out from other devices by using the initializing program. In such cases, different types of memories, such as ROM, static RAM, dynamic RAM and the like coexist in the network control system. Consequently, it is impossible to use the control system adapted for only specific types of memories. To cope with this problem, a processor with general purpose control system is used, and further a circuit for generating control signals adapted for these types of memories must be installed in the memory system. The additional circuit is complicated in circuit construction. Further, since it is assembled into the memory system, the number of parts and the circuit mounting area are increased in constructing the network control system. Further, an access time to the memory is increased by the operating time of the additional circuit.

When the control system for specific memories is used, the output mode of an address signal and the control signal differ with the types of the accessed objects. Therefore, the required number of bus control signal lines and external terminals are increased. In this respect, this control system cannot be employed for the processor IC having only the required number of external terminals. The same problem is found in the connection of the data processor, and peripheral devices, and other types of data processors.

As described above, in the conventional bus control system, when the data processor is connected to other devices, the additional circuit is complicated in circuit construction, increasing the number of parts required, the required circuit area, and the access time to the memory.

SUMMARY OF THE INVENTION

Accordingly, an object of this invention is to provide a data processing apparatus which requires no additional circuit or a small circuit when the data processor is connected to different types of accessible objects, thereby remarkably reducing the number of parts required and the required circuit area, and increasing the memory access time.

The data processing apparatus of the present invention includes a data processing means in an integrated circuit. The data processing means provides an access control signal, and accessible object identifying data representing one of the different types of accessible object means to be accessed. The apparatus includes common data bus means and a common address bus means which are coupled between the data processing means and each of the plurality of different types of accessible object means. These common data and address bus means carry data and addresses between the data processing means and the accessible object means, respectively. The apparatus includes an accessible object determining means in the integrated circuit, which is coupled to the data processing means. The accessible object determining means determines one of the different types of accessible object means to be accessed in accordance with the accessible object identifying data. The apparatus includes a control signal generating means integral in the integrated circuit which corresponds to each type of accessible object means, and which is coupled to the accessible object determining means and the data processing means. The control signal generating means, which corresponds to the type of accessible object means determined to be accessed, converts the access control signal into a control signal recognizable by the type of accessible object means to be accessed and provides the control signal to one or more of the plurality of different types of accessible object means to make only the type of accessible object means to be accessed accessible by the data processing means.

When accessing a specific object, the data processing means supplies an access control signal to a plurality of control signal generating means. The data processing means further supplies accessible object type data to the accessible object type determining means. The determining means determines the type of the accessible object means on the basis of the accessible object type data, and selectively drives the control signal generating means corresponding to the accessed object means. The control signal generating means driven converts the access control signal into a control signal adapted for the accessible object means. An address signal and data are transferred between the specific accessible object means supplied with this control signal and the data processing means via the address bus and data bus.

BRIEF DESCRIPTION OF THE DRAWINGS

FIG. 1 is a block diagram showing a bus control system according to a first embodiment of this invention;

FIG. 2 is a block diagram showing a bus control system according to a second embodiment of this invention;

FIG. 3 shows a memory area used in the second embodiment;

FIG. 4 shows an internal/external address map used in the second embodiment;

FIGS. 5 to 8 show timing charts for illustrating the operation of the second embodiment;

FIGS. 9 and 10 are block diagrams showing other embodiments of a bus control system according to this invention; and FIG. 11 shows a memory area used in the FIG. 10 embodiment.

DETAILED DESCRIPTION OF THE PREFERRED EMBODIMENTS

Figure 5:
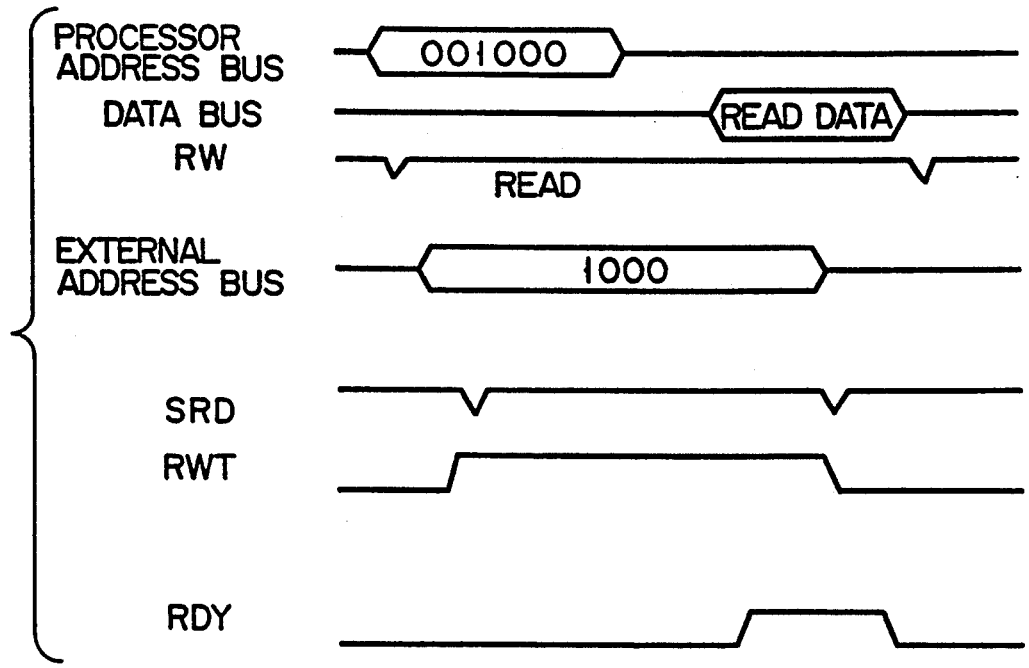

Reference is made to FIG. 1 illustrating a scheme of a data processing apparatus according to an embodiment of this invention. In this system, different types of memories are used as objects to be accessed.

In the figure, reference numeral 10 designates a data processing integrated circuit ("IC"). Different types of external memory IC's (also referred to as memories or accessible objects) 20A to 20C are accessed by data processing IC device 10. Data processing IC device 10 is comprised of processor 11, memory-type determining circuit 12, and timing signal generators 13A to 13C, which are provided corresponding to three memories 20A to 20C.

Processor 11 accesses to memories 20A, 20B and 20C to read out data from these memories, to process the Further, these are connected to timing control signal generators 13A to 13C of the data processing IC device 10 by control signal lines 23A to 23C, respectively. Also shown in FIG. 1 is an optional external controller 110 which will be described below.

With such an arrangement, on the basis of the memory identifying data output when processor 11 accesses memory, memory-type determining circuit 12 drives the corresponding timing signal generator, for example, the generator 13A. The driven timing signal generator 13A converts the access control signal output by processor 11 into a control signal adapted for the corresponding memory 20A, and outputs it to control signal line 23A. Memory 20A will be under control of this control signal, and is addressed by an address signal input from data processing IC device 10 via address bus 21. Then, data is transferred between memory 20A and processor 11, via data bus 22. Upon completion of the operation of memory 20A, timing signal generator 13A, which has output the control signal, outputs an end signal to processor 11. Upon receipt of this end signal, processor 11 completes the memory access operation.

As described above, the access control system according to this embodiment determines the type of the accessible memory to be accessed by memory-type determining circuit 12 when the memory access starts. Therefore, processor 11 can read out of and write into the memory, regardless of the type of memory now being accessed.

It is further noted that additional use of only data, and write the processed data into appropriate memories. Processor 11 forms an address signal to access any of these memories, outputs the address signal to the memories, and transfers memory identifying data, via a memory identifying data line 101, to specify the accessible memory to be accessed, to memory-type determining circuit 12. Further, processor 11 supplies an access control signal, on an access control signal line 102, to three timing generators 13A to 13C. Upon receipt of an access end signal output from each timing generator 13 on the end signal line 104, processor 11 terminates the memory access operation. Before the access starts, processor 11 sets in memory-type determining circuit 12, as memory type data, a relationship between memory identifying data and timing signals of timing signal generators.

Memory-type determining circuit 12 holds the memory-type determining data set by processor 11, through the memory-type determining data line 105, and then the type of accessible memory is determined based on the memory type determining data and memory identifying data output from processor 11. If the determined type of the memory is memory 20A, the memory-type determining circuit 12, through the memory-type determining circuit output lines 103, selectively drives timing control signal generator 13A in association with the memory 20A. The driven timing control signal generator 13A converts an access control signal on the access control signal line 102 from processor 11 into a control signal adapted for memory 20A, and outputs it at a proper timing.

Memories 20A to 20C are connected to data processing IC device 10 by a single address bus 21 and a single data bus 22. memory-type determining circuit 12 and timing signal generating circuits 13A, 13B, . . . corresponding in number to the memories 20A, 20B, . . . in data processing IC device 10 suffices for the bus control, and any additional circuit is not required for the memory IC's 20A, 20B, . . . Therefore, the conventional memory IC is available for the memory IC without any modification thereof. Any additional circuits other than data processing IC device 10 and memory IC are required for the bus control. Additionally, since no circuit exist between the processor IC and the memory ICs, a high speed access to the memory can be realized. In the above description, the operation of the bus control system when memory 20A is selected was discussed. The same thing is correspondingly applied for the selection of other memories 20B and 20C. In this case, timing control signal generators 13B and 13C operate, respectively.

A further advantage of the data processing apparatus as discussed above resides in that no additional terminals are required. It is followed by the fact that single address bus 21 can be used for different memory IC's 20A, 20B, . . .

Another embodiment of this invention will be described with reference to FIG. 2. In this embodiment, this invention is applied for a data processing apparatus which is designed for a special use. In the embodiment, two IC memories, dynamic RAM (DRAM) 20a and static RAM (SRAM) 20b are to be accessed. The memory type identifying data is an address signal, which is output from processor 11.

Data processing IC device 10 is comprised of processor 11, memory-type determining circuit 12, DRAM timing signal generator 13a, SRAM timing signal generator 13b, and address multiplexer 15. Data processing IC device 10 further comprises internal address bus 14 of 21 bits PA0 to PA20. This internal address bus 14 is connected to external address bus 21, via address multiplexer 15. 16 bits A0 to A15 are assigned to external address bus 21. Of those bits, 10 bits A0 to A9 are input to DRAM 20a. Also shown in FIG. 2 is an optional external controller 110 which will be described below.

Processor 11 outputs an address signal to internal address bus 14, and outputs an RW signal as an access control signal, which represents data read-out and data write.

A memory area accessible by processor 11 is defined by addresses "000000" and "1FFFFF", as shown in FIG. 3. Memory area 1 of 64K bytes defined between addresses "000000" and "00FFFF" is assigned to SRAM 20b. Memory area 2 of 1M bytes ranging from "100000" to "1FFFFF" is assigned to DRAM 20a.

In this case, the most significant bit PA20 of internal address bus 14 is used for the memory identifying data to identify an accessible memory, which is input to memory-type determining circuit 12 from processor 11. In memory-type determining circuit 12, the memory type determining data obtained from processor 11 is such an instruction that SRAM timing signal generator 13b is selected when PA20="0", and DRAM timing signal generator 13a is selected when PA20="1" (FIG. 3). Memory-type determining circuit 12 determines the type of an accessible memory based on the memory type determining data set by processor 11 and address signal PA20 output from processor 11. On the basis of this determination, memory-type determining circuit 12 selectively drives DRAM timing signal generator 13a or SRAM timing signal generator 13b, and at the same time outputs a mode signal MODE representing the determined type of the accessible memory to address multiplexer 15. In this embodiment, MODE signal is equivalent to address signal PA20. MODE signal of "L" level is output when PA20="0" and SRAM 20b is selected, and MODE signal of "H" level is output when PA20="1" and DRAM 20a is selected.

DRAM timing signal generator 13a, when driven, converts the RW signal into various types of control signals adapted for DRAM 20a, and outputs them via a plurality of control lines 23a. Further, this generator 13a outputs a ROWOUT signal to an address multiplexer 15, in order to output a row address signal to external address bus 21. The control signals output to control line 23a includes a DRD signal, which is a logical low "L" in the data write mode, and a logical high "H" in the data read mode, a DRAS signal indicating that the low address signal is outputting to external address bus 21, and a DCAS signal indicating that a column address signal is being output to external address bus 21. These control signals are applied to DRAM 20a, in the form of a write control signal, a row address strobe signal, and a column address strobe signal, respectively. Timing control signal generator 13 further supplies a RDY signal representing an end of the operation to processor 11.

SRAM timing signal generator 13b, when driven, converts the RW signal into various types of control signals adapted for SRAM 20b, which are output via control lines 23b. These control signals include an SRD signal) which is "L" in the write mode and "H" in the read mode, and an RWT signal as a timing signal for data read and write. These control signals are transferred to SRAM 20b in the form of a write control signal and a chip select signal. This generator further outputs a RDY signal representing an end of the operation to processor 11.

Address multiplexer 15 enables DRAM 20a and SRAM 20b with different address input modes to use the same external address bus 21. According to a mode signal from memory-type determining circuit 12 and a ROWOUT signal output from DRAM timing signal generator 13a, the multiplexer 15 outputs address signals PA0 to PA20 from internal address bus 14 to external address bus 21. In this case, the address signals on external address bus 21 have relationships with MODE's "L" and "H", and memory regions 1 and 2, as shown in FIG. 4.

MODE="L" indicates that memory-type determining circuit 12 has determined that SRAM 20b is to be accessed. In this case, address multiplexer 15 outputs address signals PA0 to PA15 on internal bus 14 as address signals A0 to A15 on external address bus 21. More particularly, the address multiplexer 15 outputs address signals PA0 to PA9 of the ten lower order bits on internal address bus 14, and address signals PA10 to PA15 of the six lower order bits, as address signals A0 to A9 of the ten lower order bits on external address bus 21, and address signals A10 to A15 of the six lower order bits.

When MODE="H", memory-type determining circuit 12 determines that DRAM 20a is the accessible memory to be accessed. In this case, the output mode differs according to the ROWOUT signal from DRAM timing signal generator 13a. When ROWOUT="H", address multiplexer 15 outputs address signals PA10 to PA19 of the ten upper order bits on internal address bus 14 as address signals A0 to A9 of the ten lower order bits on external address bus 21. At this time, valid address signals are not output to the upper order sixth bit of external address bus 21.

When ROWOUT="L", address multiplexer 15 outputs the addresses PA0 to PA9 of the upper order ten bits on internal address bus 14 as addresses A0 to A9 of the lower order ten bits on external address bus 21. At this time, valid address signals are not output to the upper order 6 bits of external address bus 21.

Figure 6:
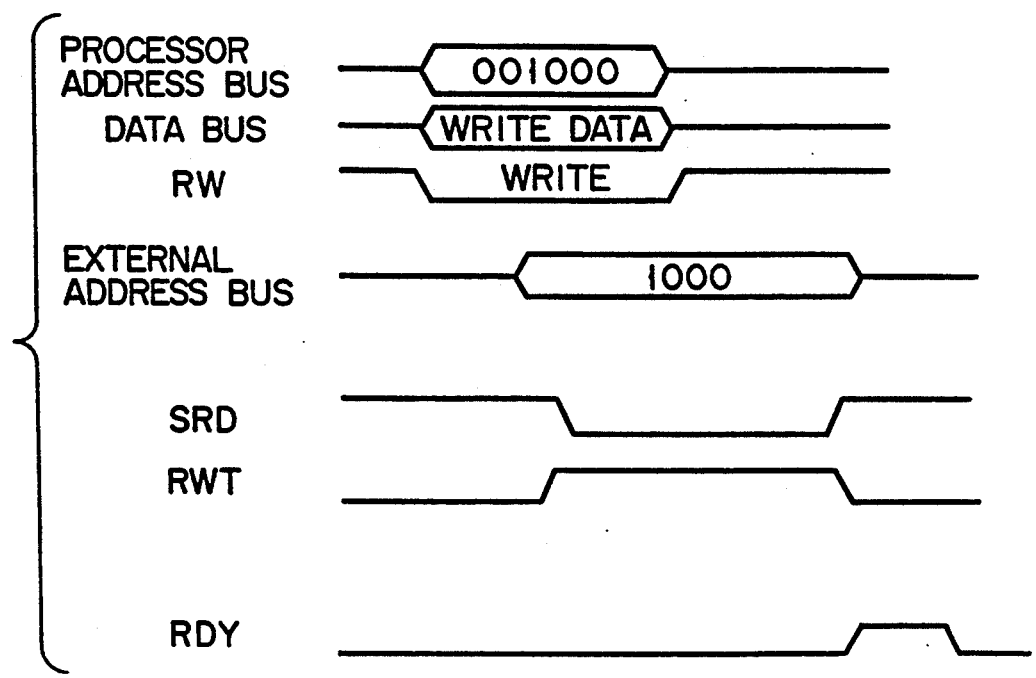

The data processing apparatus thus arranged operates as shown in timing charts of FIGS. 5 to 8. The timing charts shown in FIGS. 5 and 6 show the operation of the data processing apparatus when processor 11 selects the memory area 1 shown in FIG. 3, i.e., SRAM 20b, as an accessible object to be accessed. The timing charts shown in FIGS. 7 and 8 schematically illustrate the operation of the bus control system when processor 11 selects the memory area 2 shown in FIG. 3, i.e., DRAM 20a, as an object to be accessed.

The operation of the control system illustrated by the timing chart of FIG. 5 will first be described. In this operation, processor 11 accesses SRAM 20b (memory area 1) and reads out the data stored therein. To access to SRAM 20b, processor 11 outputs address "001000" to internal address bus 14, and renders an RW signal "H" in order to indicate a read mode.

Memory-type determining circuit 12 detects that the input address PA20 is "0", and determines that an accessible memory is SRAM 20b. On the basis of this determination, the memory-type determining circuit 12 outputs a MODE signal of "L" indicating designation of memory area 1 to address multiplexer 15, and drives SRAM timing signal generator 13b.

Since the addressed area is the memory area 1, address multiplexer 15 directly outputs PA0 to PA15 on internal address bus 14 to external address bus 21. To more accurately describe this particular function, address "1000" is output to external address bus 21.

Since the RW signal is "H", SRAM timing signal generator 13b renders an SRD signal "H", and an RWT signal "H" synchronized with the operation of SRAM 20b. Then, SRAM timing signal generator 13b makes the RDY signal "H", to inform processor 11 that the data read operation of SRAM 20b has terminated. SRAM 20b reads out data from the memory location at address "1000" after a predetermined time has elapsed since the SRD and RWT signals are both set in "H".

The read out data is transferred to processor 11 via data bus 22.

The operation illustrated by the timing chart shown in FIG. 6 is that processor 11 writes data into SRAM 20b. Also in this case, since processor 11 makes an access to SRAM 20b, the processor outputs address "001000" to internal address bus 14, loads the data into a data buffer (not shown) while at the same time rendering the RW signal "L" in order to indicate a write mode.

At this time, since the MSB address PA20 on internal address bus 14 is "L", SRAM timing signal generator 13b is driven, as in the case of FIG. 5, and address multiplexer 15 directly outputs PA0 to PA15 on internal address bus 14 to external address bus 21. Therefore, address "1000" is outputs to external address bus 21.

Since the RW signal is "L", SRAM timing signal generator 13b renders the SRD signal "L", and at the same time renders the RWT signal "H" synchronized with the operation of SRAM 20b. After this operation, SRAM timing signal generator 13b renders the RDY signal "H" to inform processor 11 that the data write operation to SRAM 20b has terminated. After a predetermined time has elapsed since the SRD signal rendered "L" and the RWT signal is rendered "L", the data on data bus 22 is written into the memory location at address "1000".

The operation of the bus control system as illustrated by the timing chart shown in FIG. 7 will be described. This operation is that processor 11 makes an access to DRAM 20a (memory area 2) to read out the data stored therein. To access DRAM 20a, processor 11 outputs, for example, address "1F1000" to internal address bus 14, and renders the RW signal indicative of the read mode "H".

Memory-type determining circuit 12 detects that the input address PA20 is "1", and determines that the accessible memory is DRAM 20a. On the basis of the determination, the memory-type determining circuit 12 outputs an "H" MODE signal indicative of designation of the memory area to address multiplexer 15, and drives DRAM timing signal generator 13a.

DRAM timing signal generator 13a synchronized the ROWOUT signal "H" with the operation of DRAM 20a, and "L" the DRAS signal. This is done for outputting the row address. The same circuit further renders the ROWOUT signal "L" synchronized with the operation of DRAM 20a, and the DCAS signal "L". This is done for outputting the column address. At this time, the RW signal from processor 11 has been "H", and therefore DRAM timing signal generator 13a renders the DRD signal "H".

Since the MODE signal is "H", address multiplexer 15 outputs PA10 to PA19 to external address bus 21 when the ROWOUT signal from DRAM timing signal generator 13a is "H", and outputs PA0 to the external address bus 21 when the ROWOUT signal is "L". Thus, the row address and the column address are applied to DRAM 20a in a time divisional manner.

DRAM timing signal generator 13a renders the RDY signal "H" to indicate that the data read operation from DRAM 20a is completed. DRAM 20b reads out the data from address "F1000" after a predetermined time has elapsed since the DRAS and DCAS signals are both rendered "L", and the DRD signal is "H". The read out data is transferred to processor 11 via data bus 22.

The operation of the data processing apparatus shown in the FIG. 8 timing chart is to write data into DRAM 20a by processor 11. This operation is the same as that of FIG. 7, except that DRAM timing signal generator 13a renders the DCAS signal "L". DRAM 20a writes into the memory location at address "F1000" the data which is derived from processor 11 and now on data bus 22, after a predetermined time has elapsed since the DRD signal is made "L".

Also in this embodiment, at the start of accessing the memory, memory-type determining circuit 12 determines the type of accessible memory to be accessed. Therefore, processor 11 can read and write data from and into the memory, regardless of the type of the memory. Provision of memory-type determining circuit 12, the same number of timing signal generators 13a, 13b, ... as that of accessed memory IC's 20A, 20B, ..., and address multiplexer 15 in data processing IC device 10, suffices for the bus control function. No additional circuits are required for memory IC's 20A, 20B, ... This feature indicates that a high speed access to the memory is realized. A further advantage of the embodiment resides in that a single address bus 21 may be used for different types of memory IC's.

Various modifications of the above-mentioned embodiments of this invention will be described.

Modification 1

In the second embodiment of this invention, the memory address space of processor 11 is simply divided into two, DRAM and SRAM. If necessary, three or more address spaces may be used. In this case, these address spaces select different types of memories.

Modification 2

To couple a plurality of memories, which are of the same type, but operate at different speeds, a necessary number of timing signal generators are provided to generate control signals in harmony with the operating speed of the memory. Memory-type determining circuit 12 determines the type of the memory according to the access memory, viz., the memory operating speed, and drives the timing signal generator on the basis of the determination. In this modification, high speed SRAM and low speed SRAM may be connected to processor IC 10, without any additional circuit.

Modification 3

As recalled, in the first embodiment, address bus 21 and data bus 22 are used for a plurality of memory IC's 20A, 20B, ... The control lines 23 for transferring control signals to memory IC's are independently provided. Alternatively, the result of determination by memory-type determining circuit 12 is output to exterior of data processing IC device 10. The staggered control signals are output via a single control signal line. An additional circuit externally provided selects any of these control signals on the basis of the determination, and directs the selected one to the corresponding memory.

Figure 9:
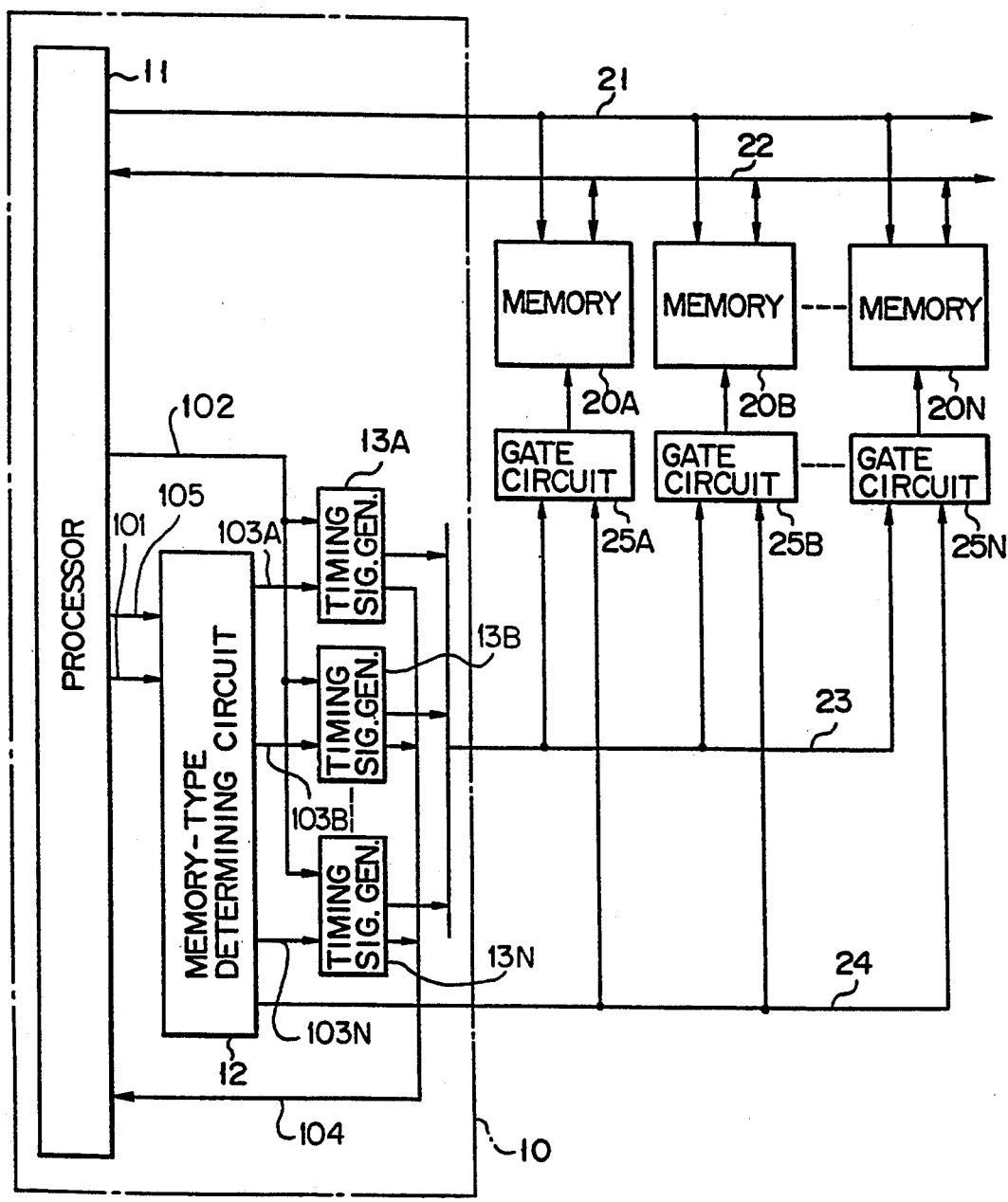

This modification is implemented into a circuit as shown in FIG. 9. In this circuit there are N types of external memory IC's 20A to 20N. Data processing IC device 10 includes N timing signal generators 13A to 13N corresponding in number to external memory IC's 20A to 20N. The processor 11 is connected to the N timing signal generators 13A to 13N by an access control signal line 102 and to a memory-type determining circuit 12 by a memory-type determining data line 105 and a memory identifying data line 101. The memory-type determining circuit 12 is connected to the N timing signal generators 13A to 13N by N memory-type determining circuit output lines 103. The control signals generated from those generators 13A to 13N are transferred via a single control line 23 to the outside of data processing IC device 10. The determination by memory-type determining circuit 12 is directly output to control line 24.

Gate circuits 25A to 25N are provided in connection with memory IC's 20A to 20N, respectively. These gate circuits 25A to 25N are supplied with the signals on control lines 23 and 24 in parallel fashion.

According to the determination by memory-type determining circuit 12, one of gate circuits 25A to 25N selects and outputs the control signal on signal line 23.

With such an arrangement, use of a small number of additional circuits, i.e., gate circuits 25A to 25N allows signal line 23 to be used in common for the connection of a number of memory IC's. This prevents an increase of the external terminals of processor IC.

Modification 4

In case that a number of the same type memories are used, the determination result by memory-type determining circuit 12 is output to exterior to select one of the memories by the output signal. The determination result is logically summed, and a timing signal generator provided for those memories is driven in accordance with the logical sum. This modification requires only one timing signal generator 13.

Modification 5

In the first embodiment, the address signal output from processor 11 is used for determining an accessible by memory-type determining circuit 12. If necessary, a type of data other than the address, for example, a signal for discriminating the instruction fetch period of processor 11 from the data access time, may be used for the same purpose. For example, during the instruction fetch period, an ROM in which a program is stored is accessed, while during the data access time an RAM in which data is stored is accessed. In this case, different accessible memories can be accessed even when a common address is output. Thus, a programming memory and a data memory can be used even if the processor has a small address area.

Modification 6

In the first and second embodiments, processor 11 is used for setting the memory type data as reference in determining the type of memory by memory-type determining circuit 12. If required, the memory type data may be set from a means provided outside data processing IC device 10. In case that the memory has previously been determined, the reference may be fixedly set in memory-type determining circuit 12.

Modification 7

In the first and second embodiments as mentioned above, timing signal generators are provided for different memory IC's, respectively. Alternatively, a single timing signal generator may be used for different memory IC's. In this case, the timing signal generator changes its operation mode according to the result of determination by memory-type determining circuit 12. This modification is advantageous when it is applied to for the modification 2 in which the memories used are of the same type, but operate at different operating speeds. The reason for this is that the control signals of the same type, but at different timings are required. This modification can reduce the circuit size.

Modification 8

In this modification, the timing signal generator is driven by the result of determination by memory-type determining circuit 12, and the accessible memory IC's to be accessible are doubled. More specifically, the address output by address multiplexer 15 is limited to a part of the address output from processor 11. According to this modification, a high speed access system for the DRAM, for example a static column or a page mode, can be used effectively.

A feature of the high speed access system resides in that the access speed is high in a case where the row address is common and only the column address is different. However, the access speed is low in a case where the row address is different, since it is required that the operation of the DRAM be stopped. Consequently, while the processor fetches an instruction to be executed next, addresses in which the row address does not change may be accessed. Thus, it is preferable that the high speed access mode is set to the memory, even when an instruction fetch is not required.

However, discontinuous addresses in which the row address is different will possibly be accessed in the case of data access. Thus, it is preferable for an effective high speed access that after the access the high speed mode is released and the operation of the memory is stopped, so that the system is ready for a next access. One technique to accomplish this is to separate the programming memory and the data memory and optimum accesses are performed to the respective memories. According to this technique, however, if the memory capacity required for storing the program and the data is smaller as compared with the capacity of the memory device (DRAM), the memory device cannot be used effectively. Thus, it is desirable that a single memory device is operated at a different timing.

An arrangement of this modification is shown in FIG. 10. In this modification, processor 11 outputs an address signal consisting of 22 bits, PA0 to PA21.

The accessible memory IC's are DRAM 20a and SRAM 20b. DRAM 20a comprises a memory area which can be used by high speed access modes, for example, a page mode, a static column mode, or a nibble mode. A memory area accessible by processor 11 ranges from "000000" to "2FFFFF" (hexadecimal), as shown in FIG. 11. In this memory area, area 1 from "000000" to "00FFFF" are assigned to SRAM 20b. A memory area from "100000" to "2FFFFFF" is assigned to DRAM 20a. In this memory area, area 2 from "100000" to "1FFFFF" is assigned to a normal access mode of DRAM 20a. Area 3 from "200000" to "2FFFFF" is assigned to the high speed access mode of DRAM 20a.

Since DRAM 20a is divided into two areas, data processing IC device 10 comprises high speed DRAM timing signal generator 13a1, low speed DRAM timing signal generator 13a2, and SRAM timing signal generator 13b.

In this case, the type data of an accessible memory input to memory-type determining circuit 12 from processor 11 comprises two upper order bits PA20 to PA21 on internal address bus 14. Memory-type determining circuit 12 determines the type of an accessible memory based on the type of data preset in processor 11 and the address signal (PA20 and PA21) as the identifying data output from processor 11. Since the address signal actually output to external address bus 21 comprises 20 bits PA0 to PA19, if the address "1FFFFF" is accessed from "100000" or address "2FFFFF" is accessed from "200000", actually "0FFFFF" is accessed from address "000000" of the DRAM 20a.

In such an arrangement, it is assumed that an address space for storing data is set in a range from address "100000" to "1FFFFF", and an address space for storing instruction codes of processor 11 is set in a range from "200000" to "2FFFFF". When processor 11 fetches instructions in advance, it reads out instructions in a continuous address space. This indicates that the high speed access system of the DRAM can be fully utilized. In this respect, the processing speed of processor 11 can be improved. Since the memory area other than the area storing instruction codes can be accessed, as a data space, by an access system suitable for data access, a common DRAM can be used, thereby effectively utilizing the DRAM.

Modification 9

In the first and second embodiments the timing signal generator may be so designed that the output timings of the control signal and the end signal for the memory control may be changed according to a control signal externally applied by the optional external controller 110 of FIG. 1. Also illustrated in FIG. 1 are optional signal lines extending from lines 23A, 23B, and 23C to the optional external controller 110 which supply control signals from the timing signal generators 13A, 13B, and 13C to the optional external collector 110 to control the operation of the controller 110. The external controller 110 operates by receiving the control signals generated by the timing signal generators 13A, 13B, and 13C, and by generating wait signals in appropriate timing adapted for the memory, for example, Memory-A 20A, to be accessed. For example, when a memory operating slower than the memory accessible by the timing signal generator is additionally connected, the termination of access may be delayed by inputting a weight signal from exterior. If this is performed, the types of usable memories may be further increased.

While in the embodiments and modifications as mentioned above, the object to be accessed by the processor as a data processor is a memory, it may be peripheral devices, other data processors in lieu of the memory.

As seen from the foregoing description, this invention has successfully provided a data processing apparatus which requires no or small additional circuit to connect different types of accessed devices to the data processor, and can access the devices at a high speed.

We claim:

1. A data processing apparatus for selectively accessing a plurality of different types of object means, comprising:

data processing means in an integrated circuit for accessing a selected object means of the plurality of different types of object means by generating an access control signal, object designating data designating the selected object means, and correlation data correlating the object designating data to the selected object means;

a plurality of control signal generating means in the integrated circuit and coupled to the data processing means, each corresponding to one of the plurality of different types of object means; and object determining means, in said integrated circuit and coupled to the data processing means and the plurality of control signal generating means, for determining the selected object means based on the correlation data and the object designating data, and for generating a signal to selectively drive the control signal generating means corresponding to the selected object means, wherein the control signal generating means corresponding to said selected object means converts said access control signal into an object signal recognizable by said selected object means and provides said object signal to said selected object means and wherein each of said plurality of control signal generating means includes means for generating an end signal, wherein the control signal generating means corresponding to said selected object means generates an end signal so that the data processing means ends accessing the selected object means.

2. The data processing apparatus according to claim 1, further comprising means, coupled to said end signal generating means, for controlling timing of providing the end signal.

* * * * *

UNITED STATES PATENT AND TRADEMARK OFFICE
CERTIFICATE OF CORRECTION

PATENT NO. : 5,325,513
DATED : June 28, 1994
INVENTOR(S) : Koichi Tanaka et al.

It is certified that error appears in the above-indentified patent and that said Letters Patent is hereby corrected as shown below:

Title page, item [54] and col. 1,
Delete the title and insert therefor

--SYSTEM HAVING A PLURALITY OF GENERATING CIRCUITS FOR SELECTIVELY CONVERTING ACCESS SIGNAL TO CORRESPONDING OBJECT SIGNAL IN RESPONSE TO DETERMINING IDENTITY OF ACCESSED OBJECT--

Signed and Sealed this

Fourth Day of April, 1995

Attest:

BRUCE LEHMAN

*Attesting Officer*    *Commissioner of Patents and Trademarks*